US011093610B2

(12) United States Patent
Gibbs et al.

(10) Patent No.: US 11,093,610 B2
(45) Date of Patent: Aug. 17, 2021

(54) MITIGATING THREATS TO CONTAINER-BASED WORKLOADS

(71) Applicant: INTERNATIONAL BUSINESS MACHINES CORPORATION, Armonk, NY (US)

(72) Inventors: Nathaniel J. Gibbs, Iowa City, IA (US); Michael Treadway, Keller, TX (US); Matthew Mitchell Lobbes, Northlake, TX (US); Brian James Snitzer, Lancaster, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 16/567,401

(22) Filed: Sep. 11, 2019

(65) Prior Publication Data
US 2021/0073379 A1  Mar. 11, 2021

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
None
See application file for complete search history.

(56) References Cited

U.S. PATENT DOCUMENTS 9,229,759 B2    1/2016  Jujare et al.
9,794,275 B1 *  10/2017  Benameur ........... G06F 9/45558
(Continued)

FOREIGN PATENT DOCUMENTS

CN    102053873 A    5/2011
CN    102571746 A    7/2012

OTHER PUBLICATIONS

Lu et al., "Research of Penetration Testing Technology in Docker Environment." 2017 5th International Conference on Mechatronics, Materials, Chemistry and Computer Engineering (ICMMCCE 2017). Atlantis Press, 2017, 6 pgs.
(Continued)

*Primary Examiner* — Christopher C Harris
(74) *Attorney, Agent, or Firm* — William Hartwell; Matthew M Hulihan; Heslin Rothenberg Farley & Mesiti PC

(57) ABSTRACT

Mitigating threats to container-based workloads is provided by a process that includes detecting an attack against a container hosting environment that includes active and reserve container pools. The attack poses a potential threat of contamination to hosted containers. Based on detecting the attack, the process identifies a time-to-contamination, taken as an amount of time for an active container of the active container pool to become contaminated as a result of the attack. The process provisions new containers into the reserve container pool at a determined rate that is based on the identified time-to-contamination, and continuously removes, from the active container pool, active containers servicing the workload and concurrently deploys reserve containers from the reserve container pool to the active container pool to replace the removed active containers and takeover servicing the workload.

20 Claims, 8 Drawing Sheets

(56) References Cited

U.S. PATENT DOCUMENTS

| | | | |
|---|---|---|---|
| 2011/0078797 A1* | 3/2011 | Beachem | H04L 63/1441 726/25 |
| 2014/0223556 A1 | 8/2014 | Bignon et al. | |
| 2014/0310810 A1 | 10/2014 | Brueckner et al. | |
| 2016/0065612 A1* | 3/2016 | Evans | G06F 9/441 726/22 |
| 2016/0094568 A1 | 3/2016 | Balasubramanian et al. | |
| 2017/0098072 A1* | 4/2017 | Stopel | G06F 21/566 |
| 2017/0257424 A1* | 9/2017 | Neogi | H04L 43/16 |
| 2018/0027009 A1* | 1/2018 | Santos | H04L 63/1433 726/25 |
| 2018/0219899 A1* | 8/2018 | Joy | G06F 9/5027 |
| 2018/0278639 A1* | 9/2018 | Bernstein | G06F 21/577 |
| 2018/0307524 A1 | 10/2018 | Vyas et al. | |
| 2018/0322299 A1 | 11/2018 | Iyer | |
| 2018/0336351 A1* | 11/2018 | Jeffries | H04L 63/101 |
| 2019/0215332 A1* | 7/2019 | Kaplan | H04L 47/00 |
| 2020/0183716 A1* | 6/2020 | Beddus | H04L 63/1458 |
| 2020/0195665 A1* | 6/2020 | Beddus | G06F 9/5061 |

OTHER PUBLICATIONS

Manikandasaran et al. "Secure Architecture for Virtual Machine to Container Migration in Cloud Computing." Journal of Physics: Conference Series. vol. 1142. No. 1. IOP Publishing, 2018, 8 pgs.

Torkura et al. "Leveraging cloud native design patterns for security-as-a-service applications." 2017 IEEE International Conference on Smart Cloud (SmartCloud). IEEE, 2017, 8 pgs.

Balakrishnan, A., "Most hacks take minutes to do—and weeks to discover". Retrieved on Jun. 13, 2019 from the Internet URL: <https://www.cnbc.com/2016/04/27/most-hacks-take-minutes-to-do-and-weeks-to-discover.html>, Apr. 27, 2016, 7 pgs.

"Breach Detection by the Numbers: Days, Weeks or Years?" Retrieved on Jun. 13, 2019 from the Internet URL: <https://www.infocyte.com/blog/2016/7/26/how-many-days-does-it-take-to-discover-a-breach-the-answer-may-shock-you/>, Jul. 26, 2016, 7 pgs.

"Data Breaches 101: How They Happen, What Gets Stolen, and Where It All Goes". Retrieved on Jun. 13, 2019 from the Internet URL: <https://www.trendmicro.com/vinfo/us/security/news/cyber-attacks/data-breach-101>, Aug. 10, 2018, 8 pgs.

"Privilege Escalation". Retrieved on Jun. 13, 2019 from the Internet URL: <https://attack.mitre.org/tactics/TA0004/>, The MITRE Corporation, 2018, 4 pgs.

"The Stackrox Kubernetes Security Platform". Retrieved on Jun. 13, 2019 from the Internet URL: <https://www.stackrox.com/platform/>, Stackrox, 2019, 6 pgs.

"Runtime Defense—Protection for Your Entire Cloud Native Stack". Retrieved on Jun. 13, 2019 from the Internet URL: <https://www.twistlock.com/platform/runtime-defense/>, 2019, 9 pgs.

Boxdell, D., "Containers & Cybersecurity: Automation is Key". Retrieved on Jun. 13, 2019 from the Internet URL: <https://www.armor.com/blog/containers-cybersecurity-automation-key/>, May 29, 2018, 7 pgs.

Mell, Peter, et al., "The NIST Definition of Cloud Computing", NIST Special Publication 800-145, Sep. 2011, Gaithersburg, MD, 7 pgs.

International Search Report and Written Opinion for PCT/IB2020/057997 completed Dec. 14, 2020, 9 pgs.

\* cited by examiner

MITIGATING THREATS TO CONTAINER-BASED WORKLOADS

BACKGROUND

Containers are virtual environments providing portability to encapsulated application(s). Various container-based virtualization environments are available and widely used. A container is instantiated from a container image by a container engine or host that provides a runtime environment for the image. Much like a virtual machine, a container can be stopped and started when needed. Containers are generally lighter-weight than virtual machines. Typical practice is to execute in a single container only what is needed to run desired application(s).

SUMMARY

Shortcomings of the prior art are overcome and additional advantages are provided through the provision of a computer-implemented method. The method detects an attack against a container hosting environment. The attack poses a potential threat of contamination to hosted containers of the container hosting environment. The container hosting environment includes an active container pool of active containers to service a workload, and a reserve container pool of reserve containers ready for deployment into the active container pool. The method identifies, based on detecting the attack, a time-to-contamination. The time-to-contamination is taken as an amount of time for an active container of the active container pool to become contaminated as a result of the attack. The method provisions new containers into the reserve container pool at a determined rate that is based on the identified time-to-contamination. Additionally, the method continuously removes, from the active container pool, active containers servicing the workload and concurrently deploys reserve containers from the reserve container pool to the active container pool to replace the removed active containers and takeover servicing the workload.

Further, a computer system is provided that includes a memory and a processor in communication with the memory, wherein the computer system is configured to perform a method. The method detects an attack against a container hosting environment. The attack poses a potential threat of contamination to hosted containers of the container hosting environment. The container hosting environment includes an active container pool of active containers to service a workload, and a reserve container pool of reserve containers ready for deployment into the active container pool. The method identifies, based on detecting the attack, a time-to-contamination. The time-to-contamination is taken as an amount of time for an active container of the active container pool to become contaminated as a result of the attack. The method provisions new containers into the reserve container pool at a determined rate that is based on the identified time-to-contamination. Additionally, the method continuously removes, from the active container pool, active containers servicing the workload and concurrently deploys reserve containers from the reserve container pool to the active container pool to replace the removed active containers and takeover servicing the workload.

Yet further, a computer program product including a computer readable storage medium readable by a processing circuit and storing instructions for execution by the processing circuit is provided for performing a method. The method detects an attack against a container hosting environment. The attack poses a potential threat of contamination to hosted containers of the container hosting environment. The container hosting environment includes an active container pool of active containers to service a workload, and a reserve container pool of reserve containers ready for deployment into the active container pool. The method identifies, based on detecting the attack, a time-to-contamination. The time-to-contamination is taken as an amount of time for an active container of the active container pool to become contaminated as a result of the attack. The method provisions new containers into the reserve container pool at a determined rate that is based on the identified time-to-contamination. Additionally, the method continuously removes, from the active container pool, active containers servicing the workload and concurrently deploys reserve containers from the reserve container pool to the active container pool to replace the removed active containers and takeover servicing the workload.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
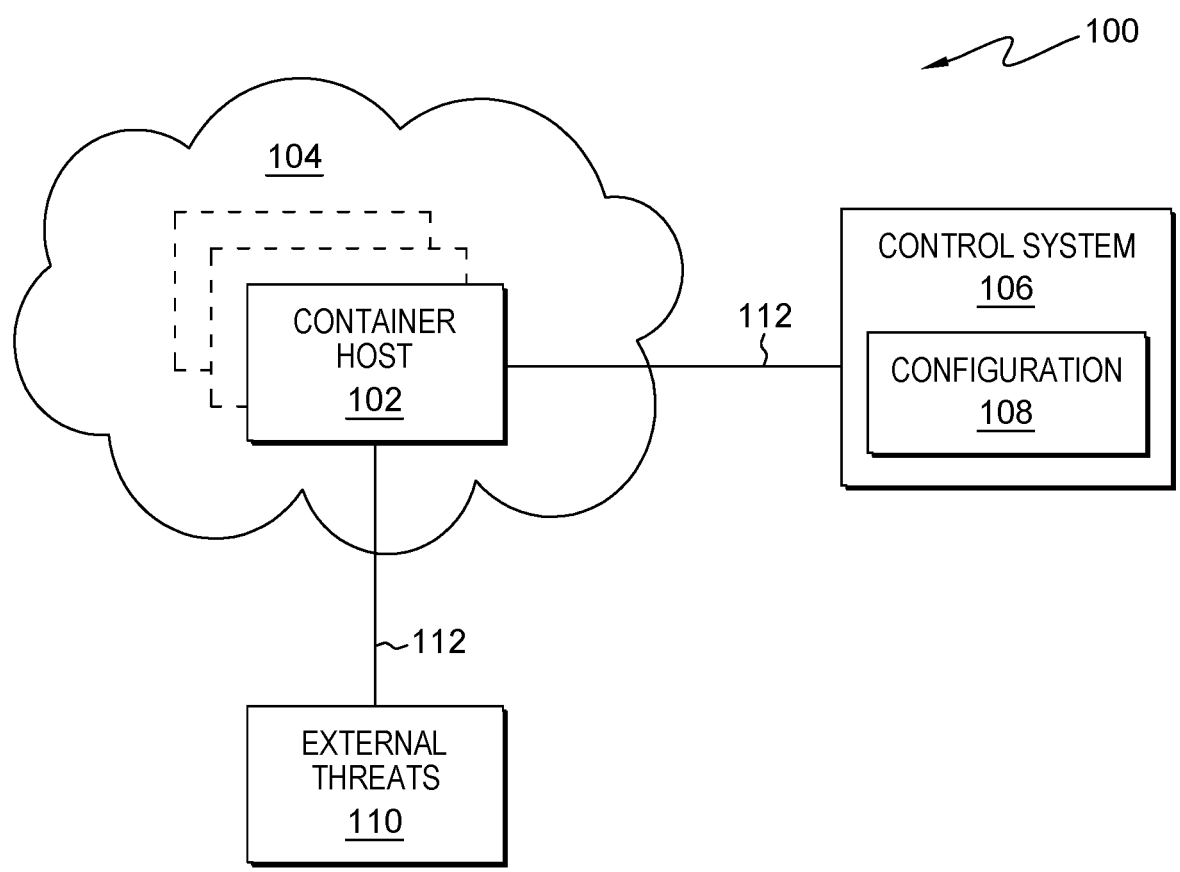
FIG. 1 depicts an example environment to incorporate and use aspects described herein.

Most attacks on vulnerable systems take only minutes to perform, and usually require a patch or workaround to be applied to running nodes or containers to mitigate the effects of the attacks. Existing methods to remediate a compromised system typically involve down time to an application, or degraded performance while the system is being patched or taken down to be re-built. Often the attacker has been able to maintain access to a compromised system for some time prior to it being remediated and/or the attacker is able to effectively re-infect the system or infect new systems while administrators are dealing with threat remediation.

Containers provide a unique opportunity to change that paradigm. Described herein are approaches for replacing active containers with freshly-provisioned containers at a rate that exceeds the rate at which the active containers can become compromised/contaminated by a detected threat. This can help mitigate effects of the attack until a permanent fix can be put in place. As is described, an attack is detected as something that poses a potential or recognized threat of contamination to hosted containers of a container environment. With reason to believe that there is an attack underway, an estimated or actual time for the attack to penetrate the environment and reach the subject containers is determined. This informs a rate at which new containers are to be provisioned on an ongoing basis in order to replace existing containers that have become compromised or are identified as facing an existing threat of contamination.

Aspects take advantage of the quick "spin-up" and "spin-down" times or containers and their "vanilla" state upon provisioning in presenting approaches for mitigating attacks on vulnerable systems until a permanent patch or work-around can be put in place. In some embodiments, containers are cycled quickly, meaning they are provisioned to an active pool and have a relatively short lifespan therein before being replaced by other, vanilla, containers. In some embodiments, after a container has been active for a set amount of time in an active container pool that handles traffic or other workload servicing, it is removed from the pool of active containers and replaced by a "clean", newly provisioned container. Due to the immutability of containers, newly provisioned containers can be provisioned based on a known, good configuration. The cycling of active containers can be done continuously, i.e. on an ongoing basis over time, to keep the pool of active containers clean from compromise and functioning normally.

The containers in the active pool can be stateful, stateless, or a combination. Working with stateless containers enables them to be abruptly terminated and replaced with a next container without persisting a state. Alternatively, if a container contains state to be saved, this can be written out (stored) before downing the container. Additionally or alternatively, some or all containers being removed from active state can undergo a 'graceful' shutdown/deprovision, giving them an opportunity to persist anything desired.

In addition, some embodiments could capture a copy of a container's image prior to deprovisioning the container. This image can be used for future forensics analysis or another purpose, if desired.

Accordingly, aspects leverage a container deployment model to decrease an attack surface by reducing the time a container is active. A process continually cycles through active containers in order to down contaminated containers and/or prevent contamination of containers in the first place. In embodiments, active use containers are cycled-through fast enough that they are used only for a short enough time before an attack can compromise (infect, penetrate, modify, etc.) the containers.

A contamination time calculation is disclosed and used in order to optimize an amount of time that a container remains active and uncompromised. An excess capacity calculation is also used in order to dictate a number of "ready" containers to have on hand.

FIG. 1 depicts an example environment 100 to incorporate and use aspects described herein. Environment 100 is a container environment in this example. Example container offerings include OpenShift®, offered by Red Hat, Inc. (Raleigh, N.C.; of which OPENSHIFT is a registered trademark), and Docker® (offered by Docker Inc, San Francisco, Calif., U.S.A.; of which DOCKER is a registered trademark), though others are known.

Although the environment of FIG. 1 depicts a container environment, and examples are presented herein in the context of container technology, it is understood that aspects described herein work with other types of virtual environment technology, such as virtual machines (VMs) executing on VM hosts.

Referring to FIG. 1, environment 100 includes container hosts 102 providing facilities for at least container execution and hosting of container pools, and in some cases a repository/registry for container images. The container hosts 102 are themselves hosted in a cloud environment 104 or other network infrastructure. In one embodiment, container host(s) 102 host a ready/reserve container pool of containers and an active use container pool of containers. A control system 106 communicates with the container hosts(s) 102 via the internet or other network(s) to manage the instantiation/provisioning of containers on the container hosts from container images, as well as the deploying into, and removal of containers from, various pools.

During container execution, the container(s) may be subject to external threats 110. The threats may come in the form of attacks against the container hosting environment/container hosts 102.

The components in FIG. 1 form wired or wireless network(s) of devices, and communication between the devices takes place via wired or wireless communications links 112 for communicating data between the devices. FIG. 1 is just one example of an environment to incorporate and use aspects described herein; many other examples are possible and contemplated as being compatible with the capabilities described herein.

In a typical example, the control system 106 reads a configuration 108 for provisioning containers in the container host(s) 102. The configuration can dictate characteristics like how often to provision a new container and how often to quarantine/deprovision existing active use container(s). The control system 106 can identify container images from which to initiate the instantiation of containers and placement into the appropriate pool. In a particular example, the container is provisioned to a ready/reserve pool, which is a pool to hold instantiated containers that are ready but not yet placed into active use to service a workload. Initiating container instantiation can include sending a call or other command from the control system 106 to a container host 102 or management system thereof. The call/command can direct the container host to instantiate the container in the container host from the container image. In some examples, the container host obtains the image from a repository local or remote to the container host. The configuration 108 could specify parameters to use in instantiating one or more containers.

The control system 106 also controls the deprovisioning/removal of active containers from the active container pool to a deprovision or quarantine status, where they no longer actively process workload. In some examples, a deprovisioned container is terminated and its resources released back to the host's available resource pool.

In some examples, the control system 106 is, or includes, a provision/quarantine engine discussed herein.

Configuration 108 refers to the processes, directives, information, commands, and/or specifications dictating the provisioning and deprovisioning of containers, as well as their movement from the reserve pool to the active pool, in accordance with aspects described herein.

The example of FIG. 1 depicts several components that can be implemented by/on one or more computer systems, for instance as software executing thereon.

Figure 2:
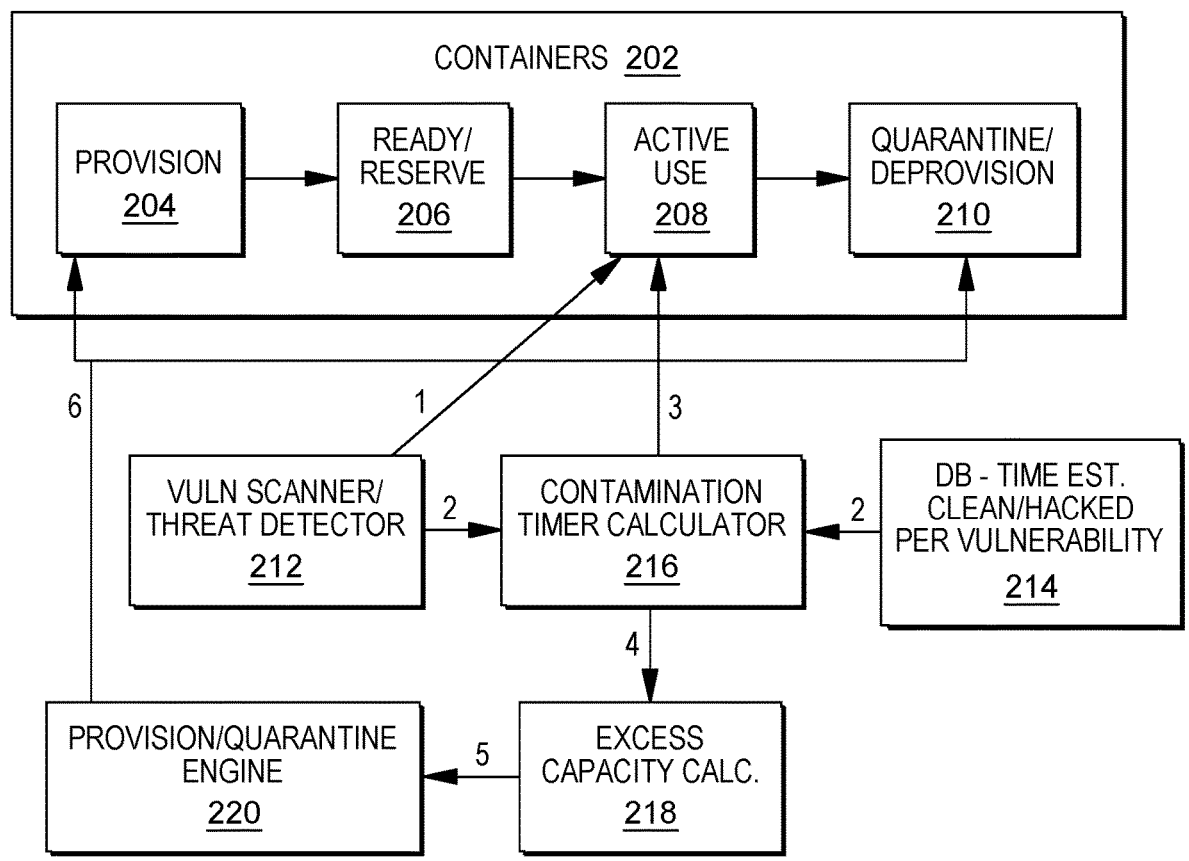
FIG. 2 depicts a conceptual diagram for automated response to detection of threats to cloud containers, in accordance with aspects described herein.

FIG. 2 depicts a conceptual diagram for automated response to detection of threats to cloud containers, in accordance with aspects described herein. 202 represents a collection of containers and their progression from provisioning 204 into a reserve/ready container pool 206 of reserve containers ready for deployment. From there, the containers are deployed for active use into an active container pool 208 of containers that service (e.g. process)

workload(s). In accordance with aspects described herein, containers are removed from the active container pool 208 to quarantine/deprovision area 210 to be replaced with reserve containers.

Further components of FIG. 2 include a vulnerability scanner/threat detector 212, contamination time calculator 216, database 214 of estimated contamination times for each of multiple vulnerabilities, excess capacity calculator 218, and provision/quarantine engine 220 that controls provisioning of containers, quarantining/deprovisioning of containers, and movement of containers between pools in collection 202.

In an example sequence of events, at "1" the threat detector 212 performs real-time scanning and threat detection in the environment, including detection of threats against containers in the active container pool 208. The threat detector 212 detects an attack against the container hosting environment. Detection of the attack could be recognized or triggered based on any desired factor(s). What is regarded as an attack that triggers later aspects of the sequence can be made configurable. It could depend on factors such as the security level desired, sensitivity of the information being processed by the containers, particularities of the hosting environment, the technology involved, and/or assessed levels of ongoing threat activity, as examples. In general, a detected attack is taken to pose a potential or actual threat of contamination to hosted containers of the container hosting environment.

Threat detection can therefore detect threats that might affect the active containers and sense actual contamination of containers. As part of this, it can sense and log the times of contamination and threat detection. In some embodiments, this detection includes identifying a particular threat and capturing information about the threat, for instance its attack vector, ports/addresses affected, data files, process(es), and the like. The threat detector passes relevant information about the threat to a contamination time calculator.

In the sequence at "2", the contamination time calculator receives the information from the threat detector 212 and refers to database 214 for a time-to-contamination estimate, e.g. an estimate of the time for the threat to contaminate a clean container. In an example, this database is implemented as a table of approximate compromise times for various threats. If the threat cannot be identified sufficiently, for instance it is new or unrecognized, a default estimate of the compromise time can be used. An example default compromise time to use is 30 seconds.

The database provides an estimated minimum time-to-contamination, referring to an estimate of the time that an attack reaches the active containers and contaminates them. Some attacks can be detected prior to any actual contamination of a target active use container. There could be a window of time between an initial break-in (at the front end) and contamination of the backend. For instance, an attack at a frontend component (container or otherwise) could inform that an attack is present and that a threat is posed to backend components (e.g. backend containers servicing a workload). An initial time-to-contamination in this example can be taken as an estimate of the time from when the attack is detected to a time that containers are compromised. The estimate of contamination time could be an estimated amount of time for an attack to penetrate the frontend and contaminate the backend. This is regardless of whether or not the backend is, or has been, actually compromised.

Then, the contamination time calculator can monitor ("3") new containers moved from "ready/reserve" to "active use" and determined timing for them to become actually contaminated (if the threat is actually contaminating them), in order to determine an actual minimum time in which a "vanilla" container can be compromised. This can be used to refine the estimate of minimum contamination time from "2". Any observed, actual minimum contamination time can be saved to the database to refine the table-based estimate, if the observed minimum time is less than the estimated time indicated in the database.

Thus, calculator 216 can observe active container pool 208 to observe when containers are deployed into active use and identify, based on observing the active pool and/or receiving indications from the threat detector 212, time times it takes for active containers to become compromised.

Accordingly, based on detecting an attack, a time-to-contamination is identified. The time-to-contamination is taken as an amount of time for an active container of the active container pool to become contaminated as a result of the attack. In some examples, as explained above, the identified time-to-contamination is set to an initial value that is prespecified and taken from the database as an estimated time-to-contamination based on information about the detected attack as provided by the threat detector. This initial time-to-contamination could then be adjusted based on detecting actual contamination of an active container of the active container pool. That is, it could be adjusted to the amount of time between a first time (when the active container was deployed to the active container pool from the reserve container pool) and a second time (when the active container was contaminated as a result of the attack).

When a threat is detected, aspects described herein commence a process to proactively remove active use containers from the active container pool 208 to the "quarantine/deprovision" pool. Meanwhile, new containers are provisioned from the ready/reserve pool 206 into active use (pool 208) to replace the processing resource that was being provided by the deprovisioned former active use container. Containers deployed into the active use pool are deployed from the ready/reserve pool 206. The process determines a rate to provision new containers into the reserve container pool 206, based on the identified time-to-contamination, so that a desired number of containers remain ready and in reserve to provision to active use (208) at a rate sufficient to prevent contamination of containers in the active container pool 208. Determining this rate to provision new containers to reserve state is accomplished by excess capacity calculator 218. The excess capacity calculator 218 takes (at "4") the time-to-contamination from the contamination time calculator 216. It also takes as input a total number of needed active use containers—that is, a number of concurrent, active use containers deemed sufficient to service the workload—and the spin up time for a container. This information can be provided from a user, engine 220, or any other source. The excess capacity calculator 218 then determines a rate at which to spin-up/provision new containers into the ready/reserve pool 206, to ensure there are enough containers spun-up and waiting in the "ready/reserve" state.

In some embodiments, identical, 'all-purpose' containers are used so their spin-up time is the same. In embodiments that use different groups of specialized containers with varying attributes such that spin-up times vary, the sequence of FIG. 2 can be performed for each such group to determine respective times-to-contamination and excess capacity calculations, and cycle the active user containers of each respective group accordingly.

The rate at which to provision new containers into the reserve container pool can be based on the time-to-contamination, a total number of concurrent active containers to service the workload, and an amount of time to spin-up and provision a new container into the reserve container pool. To determine the rate:

Assume all active use containers could be attacked at the same time (worst case);

Assume there are X concurrent active use containers needed to satisfy load;

Set minimum time-to-contamination=Y;

Set spin-up time for the containers=Z;

Then, X containers should exist in ready/reserve, by a period of Y time, to be ready for deploying to active use so that the reserve containers could fully replace all active use containers, assuming a worst case in which all active use containers were infected in minimum time Y.

Therefore, a formula Z/Y*X give the number of nodes that are to be spun-up each Z seconds, i.e. the determined rate.

By way of specific example, assume spin-up time is 10 seconds, time-to-contamination is 20 seconds, and 10 active nodes (containers) are needed to service the workload. Then, the rate is 10/20*10=5. This is the number of nodes to spin-up each 10 seconds. That will result in a pool of 10 reserve nodes every 20 seconds, so that they can replace a contaminated 10 active nodes.

Thus, based on the contamination time (provided at "4" from the contamination time calculator to the excess capacity calculator) and on other parameters including number of active containers needed and spin-up time, the excess capacity calculator 218 determines the number of containers to spin-up and the frequency to do so. The respective parameters of the formula could come from any appropriate entity. For instance, the provision/quarantine engine 220 might have knowledge about spin-up time based on its provisioning activity. The number of active use containers needed could be specified by a user and/or dictated by a workload manager or other component, for instance.

The provision/quarantine engine 220 can handle the tasks of continually provisioning new containers, moving them to ready/reserve, then to active use and (upon contamination or prior thereto) to quarantine state, then deprovision them. Thus, "6" in the sequence of FIG. 2 refers to continuously removing, from the active container pool, active containers servicing the workload and concurrently deploying reserve containers from the reserve container pool to the active container pool to replace the removed active containers and takeover servicing the workload. The removal of one or more containers from the active container pool 208 could be performed upon observing actual contamination of the one or more containers. Alternatively, the removal of active container(s) servicing the workload in the active container pool and deploying new ones to the active container pool could be performed regardless of whether the active container(s) being removed have been detected to be contaminated. Meanwhile, engine 220 can provision new containers into the reserve container pool 206 at the determined rate, i.e. as determined by the excess capacity calculator 218. In this manner, the provisioning/deprovisioning may be operated based at least in part on the excess time calculator component 218. In some embodiments, the removal of containers from the active use pool and deploying of new containers to the active use pool is performed at the determined rate that new containers are provisioned to ready/reserve, and no actual compromise of containers in the active use pool is observed, since the containers are being cycled faster than the attack can contaminate them.

In some embodiments, when removing an active container to quarantine/deprovisioned status, the engine 220 can force a 'graceful' shutdown of the container. This is optional. In some examples, it is based on whether the container has a state to save. If so, and graceful shutdown is requested, a state of the removed active container can be saved. Further, a deployed reserve container to replace the removed active container could, if desired, resume workload processing using that saved state of the removed active container.

Ongoing processing can further include monitoring, as containers are being continuously removed from active use and replaced with new containers concurrently deployed to active use, whether active containers of the active container pool are actually being contaminated as a result of the detected attack. If not actually being contaminated, then this may present an opportunity to slow the cycling of containers, which can reduce power and other resource consumption. If containers are being contaminated, this can inform that the cycling should speed up, and so too might the rate at which new containers are provisioned into ready/reserve state. Thus, based on the monitoring detecting that active containers of the active container pool are being contaminated as a result of the detected attack, processing can increase the rate at which active containers are removed from the active container pool by the continuously removing. This rate can be increased to be equal to, for example, the determined rate at which new containers are being provisioned into the reserve container pool. This provides for speeding up the cycle. Assuming the time-to-contamination is accurate, then eventually no active use containers will become contaminated by the threat. However, in the event that active containers are being compromised despite cycling at the rate determined by the excess capacity calculator, then this means that contamination is occurring faster than the determined minimum time-to-contamination used at 218. In this case, the threat detector 212 and/or contamination time calculator would pick-up a lower minimum time-to-contamination and feed that to the excess capacity calculator 218 for updating the rate to provision reserve containers. In addition, the new minimum time-to-contamination can be saved in database 214, if desired. The cycle rate to remove active containers and deploy new ones can be increased (i.e. speed up the cycling) to match the new determined rate. Speeding up the cycling will therefore eradicate the contamination from the active use pool.

In contrast, the cycle rate—the speed at which active containers are removed from the active container pool to be replaced with new containers—can be decreased (i.e. slowed) in various situations. One such situation is when the monitoring whether active containers of the active container pool are actually being contaminated detects that active containers of the active container pool are not being contaminated as a result of the detected attack (or the speed of contamination has slowed). This might be detected when the newly-provisioned and deployed active containers are being configured with a remediation to the detected attack, for instance. Additionally or alternatively, the cycle rate could be decreased based on detecting that the attack has ceased.

The amount of increase or decrease to the cycle rate, and/or a ceiling or floor for the cycle rate, could be preset if desired. For instance, cycle rate might be slowed until a threshold rate is reached and/or a contamination is observed. If a contamination is observed, the cycle rate could be increased until no contaminations are observed for at least a duration of time.

If containers are not being attacked and/or compromised as quickly as the worst case scenario, the processing can stop provisioning new nodes to reserve pool at a preset "cutoff" point, for instance where the number of containers in the ready/reserve pool 206 reaches or exceeds the number of active nodes by a given ratio. Then, provisioning to the ready/reserve pool 206 could resume when the number of containers therein reaches some number relative to the number of containers in the active use pool 208, for instance once it equals the number of active containers.

Accordingly, based on a number of reserve containers in the reserve container pool reaching a threshold at a point in time, the engine 220 may temporarily cease the provisioning of new containers into the reserve container pool at the determined rate (i.e. determined by excess capacity calculator 218). The threshold can be based on a number of active containers in the active container pool at that point in time, for instance a ratio of the number of containers in ready/reserve to the number of active containers. Because this provisioning rate may not be equal to the cycle rate (removing from and deploying to the active pool 208), a surplus of ready containers could result. Temporarily ceasing provisioning new containers can prevent the reserve pool from becoming too large. Then, the provisioning of new containers into the reserve container pool can later resume, for instance at the determined rate or at another rate, based on the number of reserve containers in the reserve container pool shrinking to equal the number of active containers in the active container pool, as an example.

Aspects described herein present a model that cycles containers to mitigate container contamination and/or avoid contamination altogether in the face of a threat. This differs from approaches that simply recognize contamination and work to clean the affected environment and/or install preventative measures. It also differs from approaches that simply restart a compromised container in order to reset it, as the attack could simply persist and resume against the container as soon as the container comes back online.

Figure 3A:
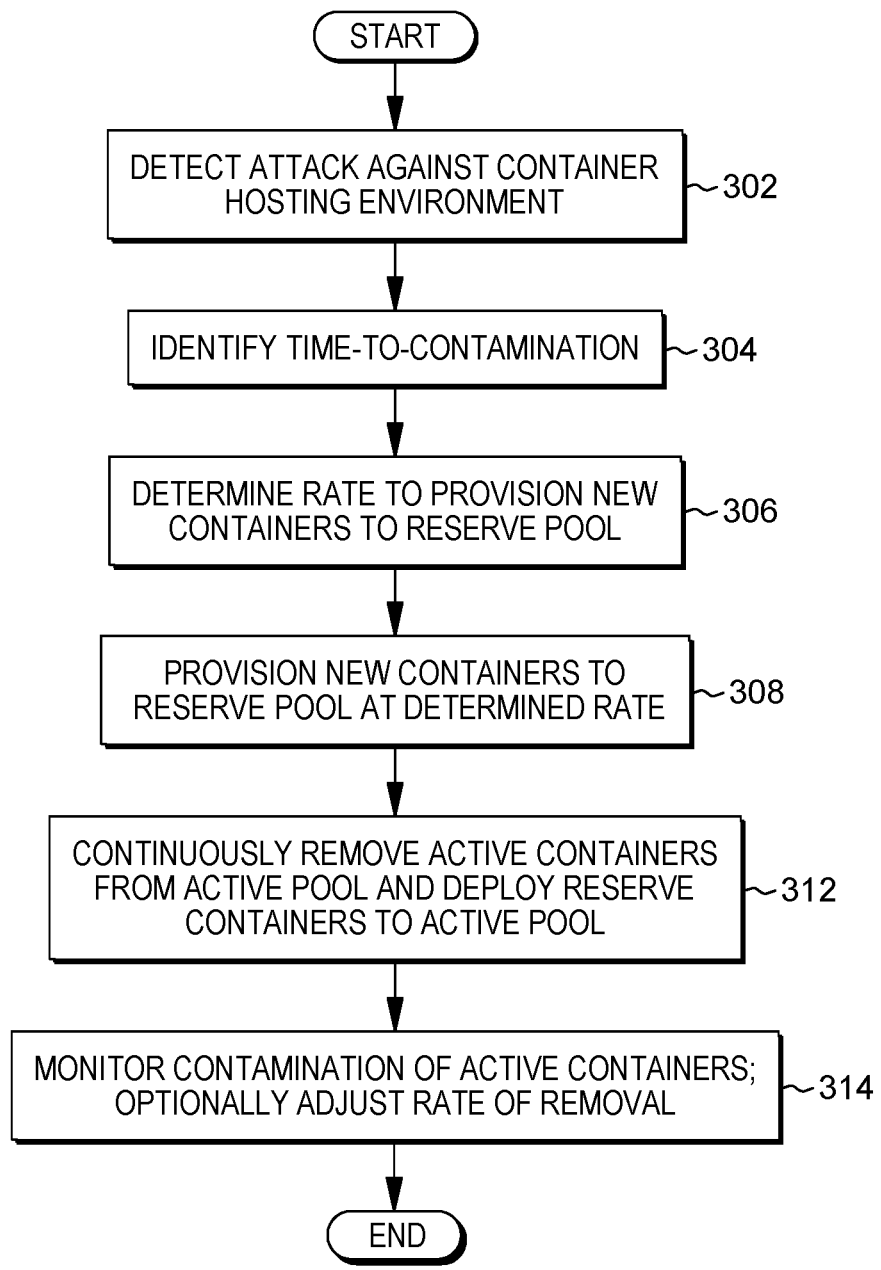
FIGS. 3A-3C depict example processes for mitigating threats to container-based workloads, in accordance with aspects described herein.
Figure 3B:
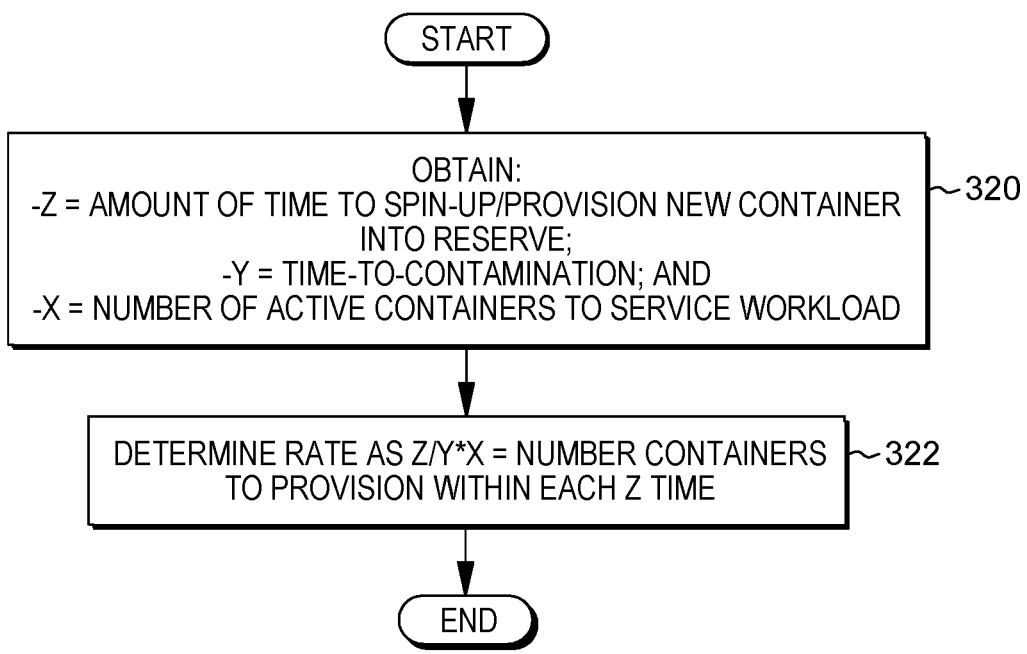
Figure 3C:
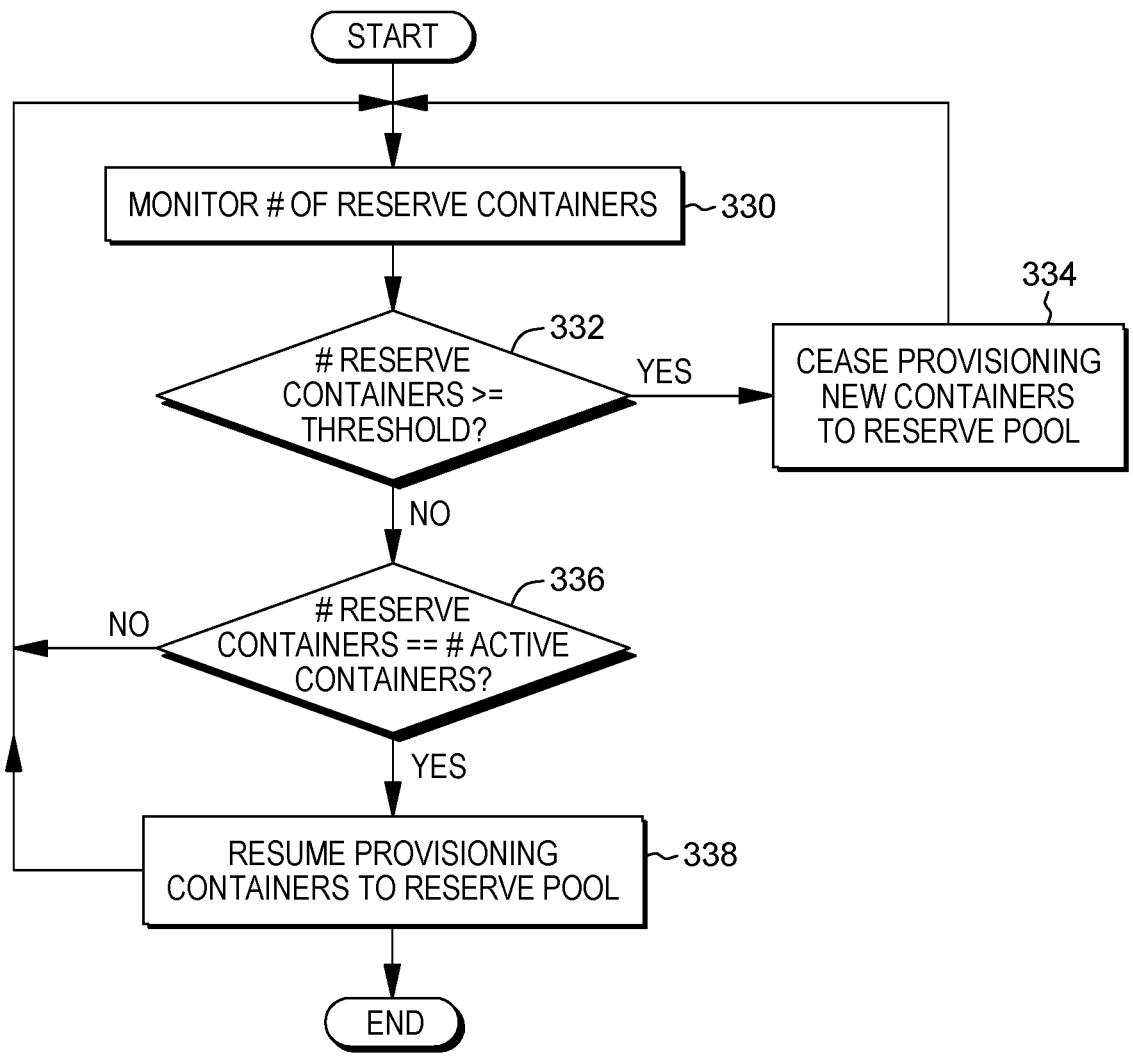

FIGS. 3A-3C depict example processes for mitigating threats to container-based workloads, in accordance with aspects described herein. In some examples, the processes are performed by one or more computer systems, such as those described herein, which may include a control system, a computer system of or connected to container hosting environment, and/or one or more other computer systems.

Referring initially to FIG. 3A, the process begins by detecting (302) an attack against a container hosting environment. In an example, this detection is made upon breach of a front-end component. The attack could be one recognized as posing a potential threat of contamination to hosted containers of the container hosting environment. The container hosting environment includes an active container pool of active containers to service a workload, and a reserve container pool of reserve containers ready for deployment into the active container pool.

Based on detecting the attack, the process identifies (304) a time-to-contamination. The time-to-contamination is taken as an amount of time for an active container of the active container pool to become contaminated as a result of the attack. In some examples, this time-to-contamination is taken, at least initially, as an estimate. The identified time-to-contamination can be set to an initial value that is prespecified as an estimated time-to-contamination, and is identified based on information about the detected attack. The process could further include adjusting, based on detecting actual contamination of an active container of the active container pool, the identified time-to-contamination to be an amount of time between a first time, at which the active container was deployed to the active container pool from the reserve container pool, and a second time, at which the active container was contaminated as a result of the attack.

The process continues by determining (306) a rate to provision new containers into the reserve container pool based on the identified time-to-contamination, and provisioning (308) new containers into the reserve container pool at that determined rate. FIG. 3B, described below, presents an example process for determining such rate.

In addition, the process of FIG. 3A continues to 310, where it continuously removes, from the active container pool, active containers servicing the workload and concurrently deploys reserve containers from the reserve container pool to the active container pool to replace the removed active containers and takeover servicing the workload. The removing the active containers servicing the workload and the concurrently deploying can be performed regardless of whether the active containers being removed have actually been contaminated, and/or have been detected to be contaminated, as a result of the attack.

The process continues by monitoring (312), during the continuously removing and concurrently deploying, whether active containers of the active container pool are being contaminated as a result of the detected attack, and optionally adjusting the rate of removal from, and deployment to, the active pool. For instance, based on the monitoring detecting that active containers of the active container pool are being contaminated as a result of the detected attack, the adjusting can increase a rate at which active containers are removed from the active container pool by the continuously removing. The increasing could increase the rate to be equal the determined rate at which new containers are being provisioned into the reserve container pool, for instance. Additionally or alternatively, the process could decrease a rate at which active containers are removed from the active container pool by the continuously removing based on, for instance, (i) the monitoring detecting that active containers of the active container pool are not being contaminated as a result of the detected attack, where the detecting that the active containers of the active container pool are not being contaminated is based on configuring the active containers with a remediation to the detected attack, and/or (ii) detecting that the attack has ceased.

In some embodiments, the process further includes performing a graceful shutdown of a removed active container, the graceful shutdown including saving a state of the removed active container, and a deployed reserve container to replace the removed active container resumes workload processing using the saved state of the removed active container.

FIG. 3B depicts an example process for determining the rate at which to provision new containers into the reserve container pool. The determining can be based on the time-to-contamination, a total number of concurrent active containers to service the workload, and an amount of time to spin-up and provision a new container into the reserve container pool. Thus, the process obtains (320) these values as Y, X, and Z, respectively. The process then determines (322) the rate as Z/Y*X=the number of containers to provision within each Z period of time.

FIG. 3C depicts example processing performed as part of the continuously removing active containers from the active container pool and deploying reserve containers to the active container pool (310). The process monitors (330) the number of containers provisioned to the ready/reserve container pool. The process determines (332) whether a number of reserve containers in the reserve container pool reaches a threshold at a point in time. In embodiments, the threshold is based on a number of active containers in the active container pool at the point in time. Based on the number of reserve containers in the reserve container pool reaching the threshold at a point in time (332, Y), the process temporarily ceases (334) the provisioning of new containers into the reserve container pool at the determined rate. From 334, the process returns to 330 to continue monitoring the number of reserve containers. If at 332 it was determined that the number of reserve containers is at or above the threshold (332, N), the process continues by determining (336) whether the number of reserve containers in the reserve container pool equals the number of active containers in the active container pool. If so (336, Y), the process resumes (338) the provisioning of new containers into the reserve container pool at the determined rate. From 338, or if at 336 it was determined that the number of reserve containers not decreased to be equal to the number of active containers (336, N), the process returns to 330 to continue monitoring.

Although various examples are provided, variations are possible without departing from a spirit of the claimed aspects.

Figure 4:
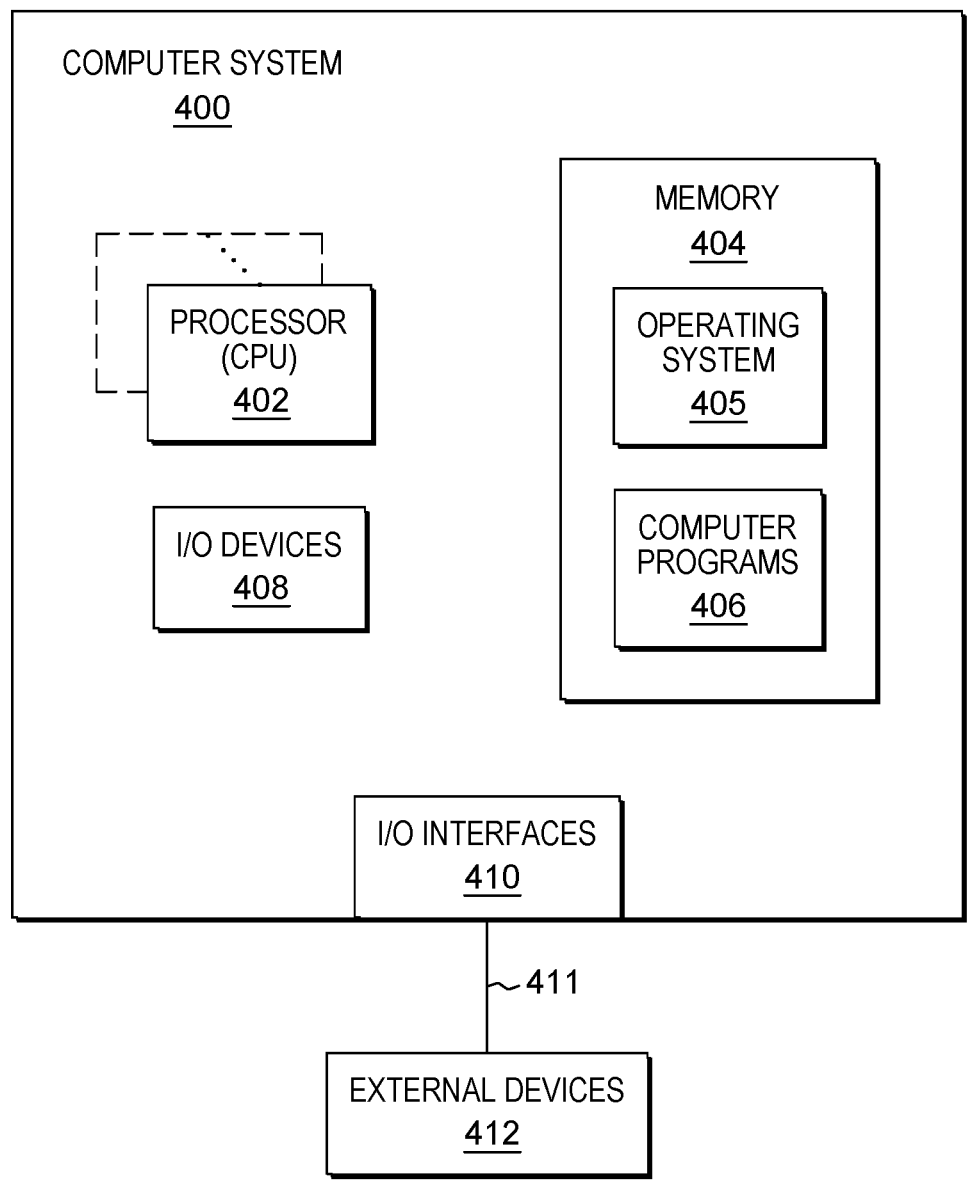
FIG. 4 depicts one example of a computer system and associated devices to incorporate and/or use aspects described herein.

Processes described herein may be performed singly or collectively by one or more computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA) or Intel Corporation (Santa Clara, Calif., USA), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC)

system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
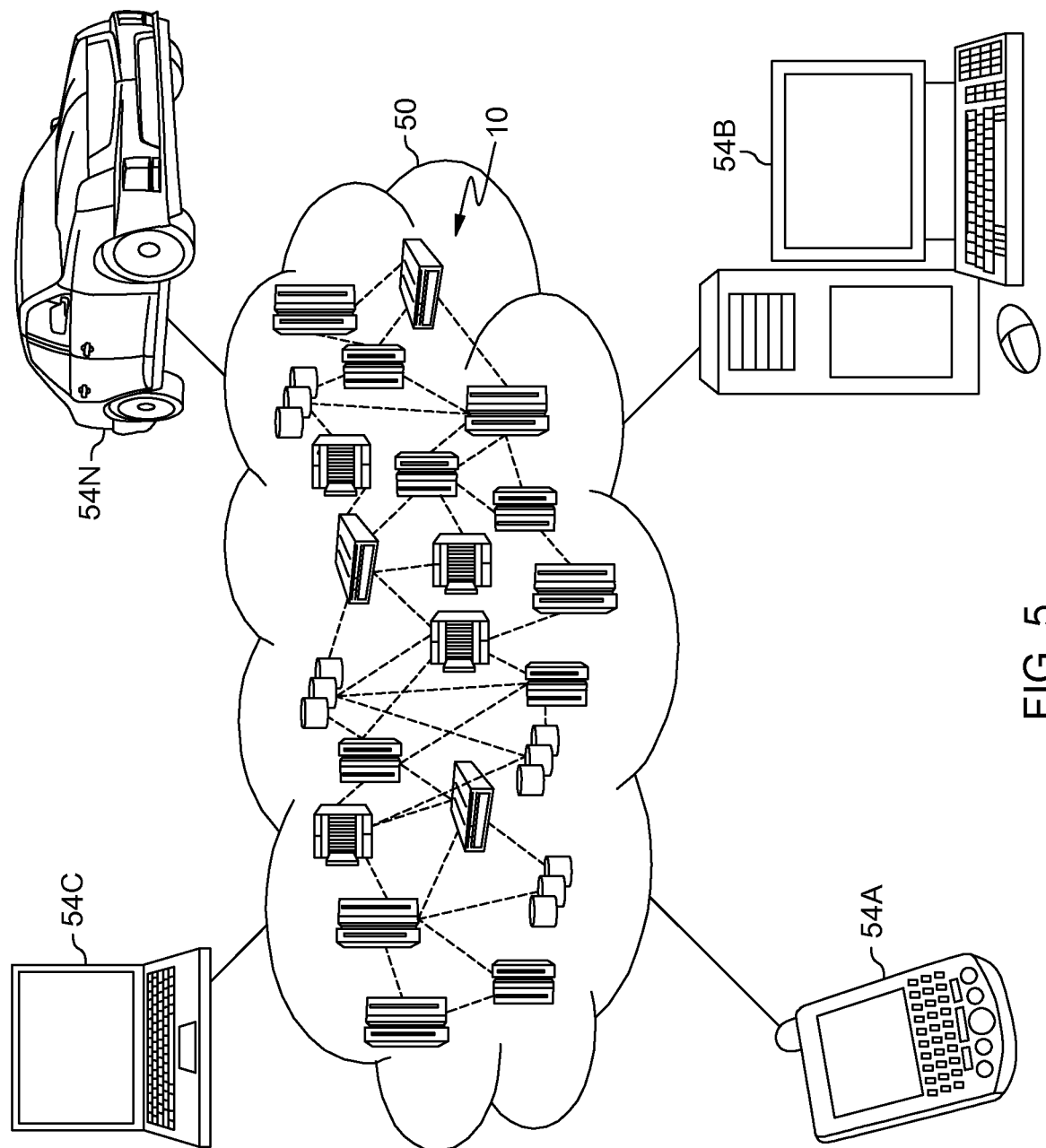
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
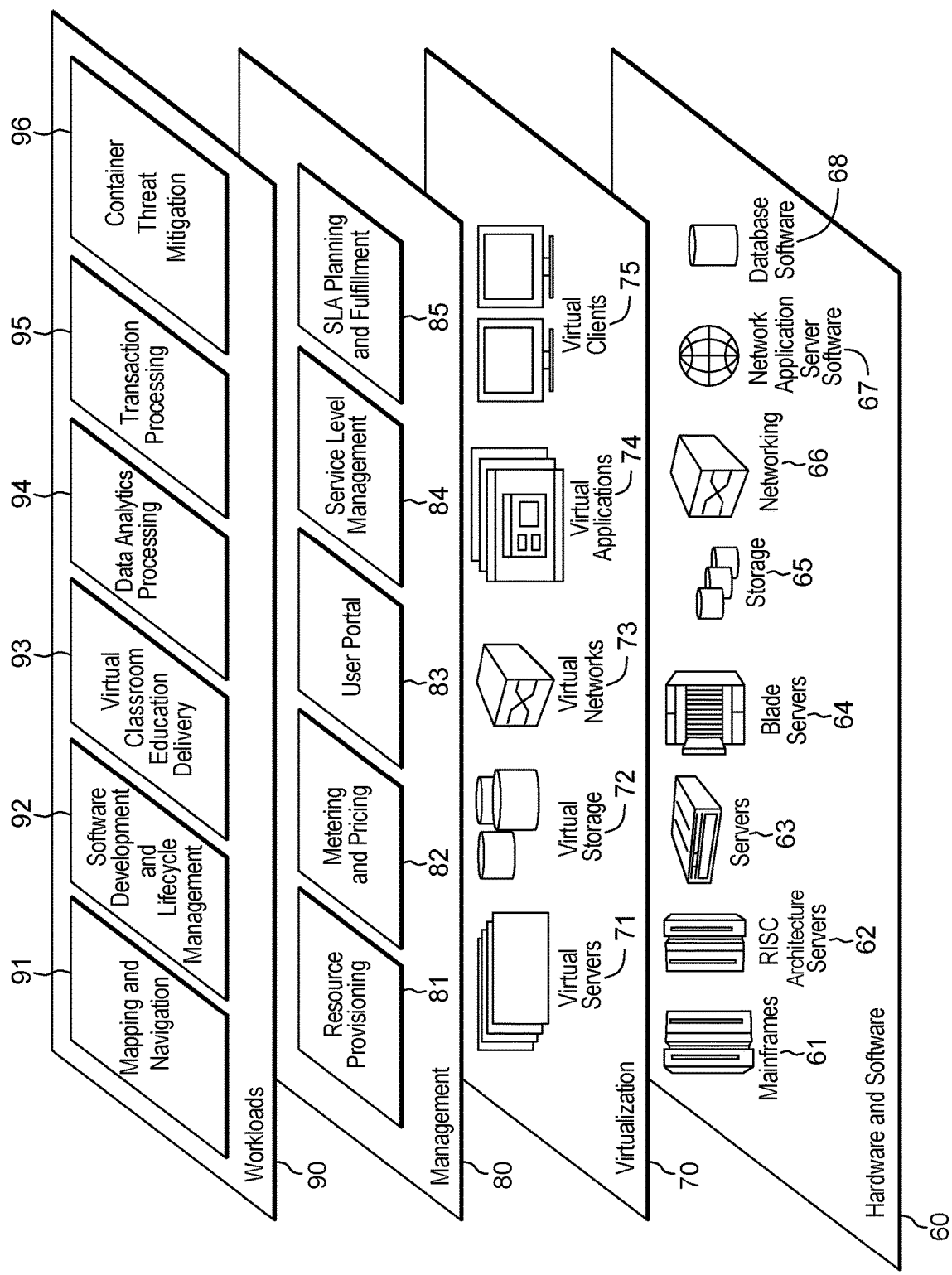
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container threat mitigation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    detecting an attack against a container hosting environment, the attack posing a potential threat of contamination to hosted containers of the container hosting environment, wherein the container hosting environment includes an active container pool of active containers to service a workload, and a reserve container pool of reserve containers ready for deployment into the active container pool;
    based on detecting the attack, identifying a time-to-contamination, the time-to-contamination taken as an amount of time for an active container of the active container pool to become contaminated as a result of the attack;
    provisioning new containers into the reserve container pool at a determined rate that is based on the identified time-to-contamination; and
    continuously removing, from the active container pool, active containers servicing the workload and concurrently deploying reserve containers from the reserve container pool to the active container pool to replace the removed active containers and takeover servicing the workload.

2. The method of claim 1, wherein the removing the active containers servicing the workload and the concurrently deploying are performed regardless of whether the active containers being removed have been detected to be contaminated as a result of the attack.

3. The method of claim 1, further comprising determining the rate at which to provision new containers into the reserve container pool, the determining being based on the time-to-contamination, a total number of concurrent active containers to service the workload, and an amount of time to spin-up and provision a new container into the reserve container pool.

4. The method of claim 3, wherein the determined rate is determined as Z/Y*X, wherein Z is the amount of time to spin-up and provision a new container into the reserve container pool, Y is the time-to-contamination, and X is the total number of concurrent active containers to service the workload, and the determined rate is a number of containers to provision within each Z period of time.

5. The method of claim 1, further comprising, based on a number of reserve containers in the reserve container pool reaching a threshold at a point in time, temporarily ceasing the provisioning of new containers into the reserve container pool at the determined rate, wherein the threshold is based on a number of active containers in the active container pool at the point in time.

6. The method of claim 5, further comprising resuming the provisioning of new containers into the reserve container pool at the determined rate based on the number of reserve containers in the reserve container pool equaling the number of active containers in the active container pool.

7. The method of claim 1, wherein the identified time-to-contamination is set to an initial value that is prespecified as an estimated time-to-contamination based on information about the detected attack, and wherein the method further comprises adjusting, based on detecting actual contamination of an active container of the active container pool, the identified time-to-contamination to be an amount of time between (i) a first time, at which the active container was deployed to the active container pool from the reserve container pool, and (ii) a second time, at which the active container was contaminated as a result of the attack.

8. The method of claim 1, further comprising monitoring, during the continuously removing and concurrently deploying, whether active containers of the active container pool are being contaminated as a result of the detected attack.

9. The method of claim 8, wherein based on the monitoring detecting that active containers of the active container pool are being contaminated as a result of the detected attack, increasing a rate at which active containers are removed from the active container pool by the continuously removing, wherein the increasing increases the rate to equal the determined rate at which new containers are being provisioned into the reserve container pool.

10. The method of claim 8, wherein based on at least one selected from the group consisting of (i) the monitoring detecting that active containers of the active container pool are not being contaminated as a result of the detected attack, wherein the detecting that the active containers of the active container pool are not being contaminated is based on configuring the active containers with a remediation to the detected attack, and (ii) detecting that the attack has ceased, decreasing a rate at which active containers are removed from the active container pool by the continuously removing.

11. The method of claim 1, further comprising performing a graceful shutdown of a removed active container, the graceful shutdown comprising saving a state of the removed active container, wherein a deployed reserve container to replace the removed active container resumes workload processing using the saved state of the removed active container.

12. A computer system comprising:
a memory; and
a processor in communication with the memory, wherein the computer system is configured to perform a method comprising:
 detecting an attack against a container hosting environment, the attack posing a potential threat of contamination to hosted containers of the container hosting environment, wherein the container hosting environment includes an active container pool of active containers to service a workload, and a reserve container pool of reserve containers ready for deployment into the active container pool;
 based on detecting the attack, identifying a time-to-contamination, the time-to-contamination taken as an amount of time for an active container of the active container pool to become contaminated as a result of the attack;
 provisioning new containers into the reserve container pool at a determined rate that is based on the identified time-to-contamination; and
 continuously removing, from the active container pool, active containers servicing the workload and concurrently deploying reserve containers from the reserve container pool to the active container pool to replace the removed active containers and takeover servicing the workload.

13. The computer system of claim 12, wherein the removing the active containers servicing the workload and the concurrently deploying are performed regardless of whether the active containers being removed have been detected to be contaminated as a result of the attack.

14. The computer system of claim 12, wherein the method further comprises determining the rate at which to provision new containers into the reserve container pool, the determining being based on the time-to-contamination, a total number of concurrent active containers to service the workload, and an amount of time to spin-up and provision a new container into the reserve container pool, wherein the determined rate is determined as Z/Y*X, wherein Z is the amount of time to spin-up and provision a new container into the reserve container pool, Y is the time-to-contamination, and X is the total number of concurrent active containers to service the workload, and the determined rate is a number of containers to provision within each Z period of time.

15. The computer system of claim 12, wherein the identified time-to-contamination is set to an initial value that is prespecified as an estimated time-to-contamination based on information about the detected attack, and wherein the method further comprises adjusting, based on detecting actual contamination of an active container of the active container pool, the identified time-to-contamination to be an amount of time between (i) a first time, at which the active container was deployed to the active container pool from the reserve container pool, and (ii) a second time, at which the active container was contaminated as a result of the attack.

16. The computer system of claim 12, wherein the method further comprises:
 monitoring, during the continuously removing and concurrently deploying, whether active containers of the active container pool are being contaminated as a result of the detected attack;
 based on at least one selected from the group consisting of (i) the monitoring detecting that active containers of the active container pool are not being contaminated as a result of the detected attack, wherein the detecting that the active containers of the active container pool are not being contaminated is based on configuring the active containers with a remediation to the detected attack, and (ii) detecting that the attack has ceased, decreasing a rate at which active containers are removed from the active container pool by the continuously removing.

17. A computer program product comprising:
a computer readable storage medium readable by a processing circuit and storing instructions for execution by the processing circuit for performing a method comprising:
   detecting an attack against a container hosting environment, the attack posing a potential threat of contamination to hosted containers of the container hosting environment, wherein the container hosting environment includes an active container pool of active containers to service a workload, and a reserve container pool of reserve containers ready for deployment into the active container pool;
   based on detecting the attack, identifying a time-to-contamination, the time-to-contamination taken as an amount of time for an active container of the active container pool to become contaminated as a result of the attack;
   provisioning new containers into the reserve container pool at a determined rate that is based on the identified time-to-contamination; and
   continuously removing, from the active container pool, active containers servicing the workload and concurrently deploying reserve containers from the reserve container pool to the active container pool to replace the removed active containers and takeover servicing the workload.

18. The computer program product of claim 17, wherein the removing the active containers servicing the workload and the concurrently deploying are performed regardless of whether the active containers being removed have been detected to be contaminated as a result of the attack.

19. The computer program product of claim 17, wherein the method further comprises determining the rate at which to provision new containers into the reserve container pool, the determining being based on the time-to-contamination, a total number of concurrent active containers to service the workload, and an amount of time to spin-up and provision a new container into the reserve container pool, wherein the determined rate is determined as Z/Y*X, wherein Z is the amount of time to spin-up and provision a new container into the reserve container pool, Y is the time-to-contamination, and X is the total number of concurrent active containers to service the workload, and the determined rate is a number of containers to provision within each Z period of time.

20. The computer program product of claim 17, wherein the identified time-to-contamination is set to an initial value that is prespecified as an estimated time-to-contamination based on information about the detected attack, and wherein the method further comprises adjusting, based on detecting actual contamination of an active container of the active container pool, the identified time-to-contamination to be an amount of time between (i) a first time, at which the active container was deployed to the active container pool from the reserve container pool, and (ii) a second time, at which the active container was contaminated as a result of the attack.

* * * * *